Oct. 2, 1923.

F. E. SIMONS 1,469,540

ORCHARD HEATER

Filed June 17, 1922

Frank E. Simons, Inventor

By C. A. Snow & Co.
Attorney

Patented Oct. 2, 1923.

UNITED STATES PATENT OFFICE.

FRANK E. SIMONS, OF LOS ANGELES, CALIFORNIA.

ORCHARD HEATER.

Application filed June 17, 1922. Serial No. 569,027.

*To all whom it may concern:*

Be it known that I, FRANK E. SIMONS, a citizen of the United States, residing at Los Angeles, in the county of Los Angeles and State of California, have invented a new and useful Orchard Heater, of which the following is a specification.

This invention relates to heaters for orchards and the like.

The object of the invention is to provide a simply constructed and efficient heater of this character which will produce a maximum amount of heat with a minimum consumption of fuel, and which will direct the heat emanating therefrom downward so that it will be evenly distributed over a considerable area.

Another object is to provide a heater of this character which may be moved readily from point to point wherever heat is needed.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1:
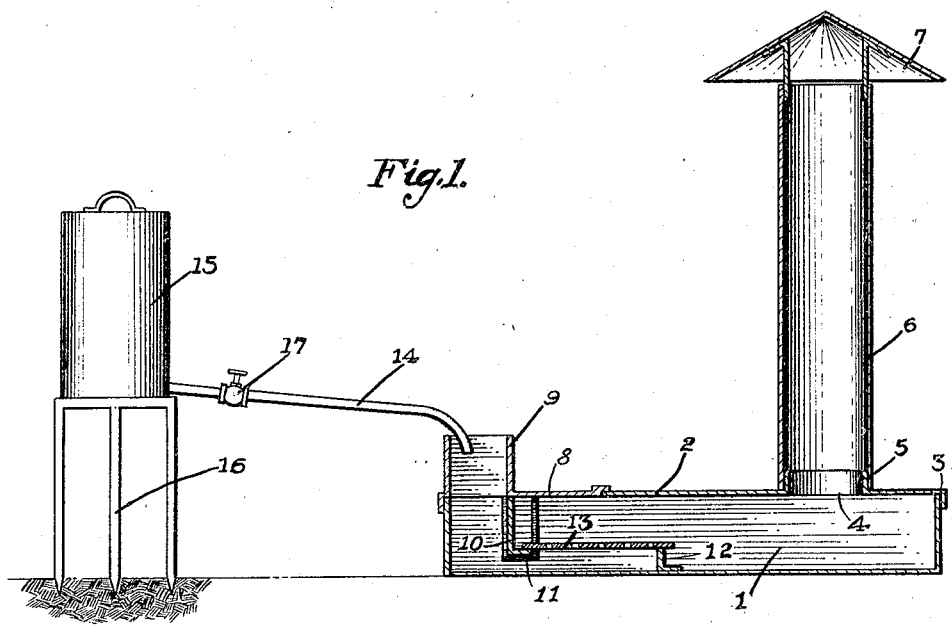
Figure 2:
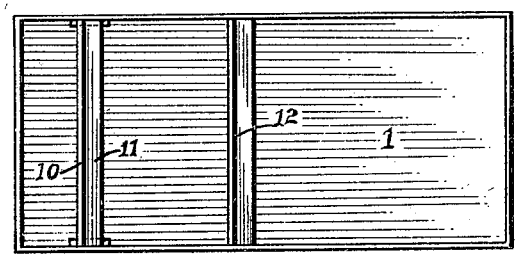

Figure 1 represents a longitudinal section of a heater constructed in accordance with this invention with the fuel supply means thereof shown in side elevation, and Fig. 2 is a top plan view of the heater with its top removed.

In the embodiment illustrated, a metal casing 1 is shown which may be of any desired configuration, being here shown rectangular and which has a removable top 2 provided with a depending flange 3 on its perimeter to fit down over the body of the heater. This top 2 has a flue opening 4 around which is arranged a collar 5 having detachably connected therewith a smokestack 6 surmounted by a head deflector 7.

The cover 2 extends over a portion only of the heater casing 1, and a complementary cover section 8 is detachably mounted on the remainder of the casing and carries an upstanding chamber 9 constituting a down draft for the heater. This chamber 9 extends transversely across the casing 1 and a plate 10 which terminates at a point spaced from the bottom of the casing 1 extends transversely across said casing in Fig. 1. This plate 10 is removable being held in position in any suitable manner, grooves at the sides being here shown for the purpose. An upstanding baffle plate 12 is arranged on the bottom of the casing 1 at a point spaced inwardly from the plate 10 which operates to deflect the heat generated in the heater against the top wall or cover thereof.

A perforated plate 13 is shown mounted on the lip 11 and the baffle 12, and operates to break up the fuel passing therethrough to assist in vaporizing it, performing the function of a burner.

An oil supply tank 15 is mounted on a suitable support 16, and has a pipe 14 leading therethrough into the down draft chamber 9 of the heater, as is shown clearly in Fig. 1. A control valve 17 is located in the pipe 14 for regulating the amount of oil to be fed to the heater.

In the use of this heater, the parts being in the position shown in Fig. 1, oil will be fed to the lower portion of the casing 1 where it will be ignited and the flames and heat rising therefrom will heat the body of the casing 1 and the products of combustion will pass rearwardly through the casing 1 and up through the stack 6 against the deflector 7 and be discharged to the surrounding atmosphere and projected by the deflector toward the ground.

The air entering through the down draft chamber 9 will be forced by the plate 10 over the oil in the casing 1 and uniting therewith forming a combustible gas, the heat generated by the burning fuel assisting in the vaporization of the fuel.

From the above description it will be obvious that a heater constructed as herein shown and described is extremely simple and cheap to manufacture, and is readily portable and collapsible so that it may be taken apart and set up for use with very little effort.

I claim:—

A heater of the class described comprising a metal casing having a removable top extending over a portion of the casing and a complementary cover section detachably mounted on the remainder of the casing and having an upstanding chamber constituting a down draft, said chamber extending transversely across the casing, a plate depending into the casing at the front of the chamber and terminating at a point spaced from the bottom of the casing, an upstanding baffle secured to the bottom of the casing at a point extending inwardly from said plate, said plate having a laterally extending lip on its inner face, a perforated plate mounted on said lip and baffle and forming a vaporizer for the fuel, and a smoke stack rising from said casing.

In testimony that I claim the foregoing as my own, I have hereto affixed my signature in the presence of two witnesses.

FRANK E. SIMONS.

Witnesses:
  MARION LA ZANSKY,
  DOLORES CARRASCO.